United States Patent
Miyamoto

(10) Patent No.: US 9,097,539 B2
(45) Date of Patent: Aug. 4, 2015

(54) VEHICLE INFORMATION PROCESSING DEVICE

(75) Inventor: Toru Miyamoto, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 144 days.

(21) Appl. No.: 13/881,476

(22) PCT Filed: Oct. 29, 2010

(86) PCT No.: PCT/JP2010/069360
§ 371 (c)(1),
(2), (4) Date: Apr. 25, 2013

(87) PCT Pub. No.: WO2012/056576
PCT Pub. Date: May 3, 2012

(65) Prior Publication Data
US 2013/0218450 A1   Aug. 22, 2013

(51) Int. Cl.
*G01C 21/26* (2006.01)
*G01C 21/28* (2006.01)

(52) U.S. Cl.
CPC .............. *G01C 21/26* (2013.01); *G01C 21/28* (2013.01)

(58) Field of Classification Search
None
See application file for complete search history.

(56) References Cited

U.S. PATENT DOCUMENTS

| 8,498,813 B2 * | 7/2013 | Oohashi et al. ............... 701/447 |
| 2006/0047420 A1 | 3/2006 | Tanaka |

FOREIGN PATENT DOCUMENTS

| EP | 0317181 A2 | 5/1989 |
| EP | 2224210 A2 | 9/2010 |
| JP | 08-334356 A | 12/1996 |
| JP | 09-304093 A | 11/1997 |
| JP | 09-311045 A | 12/1997 |
| JP | 2008-008628 A | 1/2008 |

* cited by examiner

*Primary Examiner* — Fadey Jabr
*Assistant Examiner* — Krishnan Ramesh
(74) *Attorney, Agent, or Firm* — Kenyon & Kenyon LLP

(57) ABSTRACT

An object of the present invention is to provide a vehicle information processing device which is able to specify a traveling road of a host vehicle with high reliability without including detailed map data in an in-vehicle storage unit. A driving support device according to the present invention is a vehicle information processing device which specifies a traveling road of a host vehicle, and includes means for obtaining host vehicle information including current position information of the host vehicle using a GPS; means for obtaining road information from an information transmission device which is installed in a road; means for temporarily selecting a traveling road of the host vehicle using the host vehicle information, and the road information on the surrounding roads; and means for specifying a traveling road of the host vehicle using a reliability of a temporary selection result of the means for temporarily selecting traveling road.

8 Claims, 10 Drawing Sheets

Fig.2
(a)
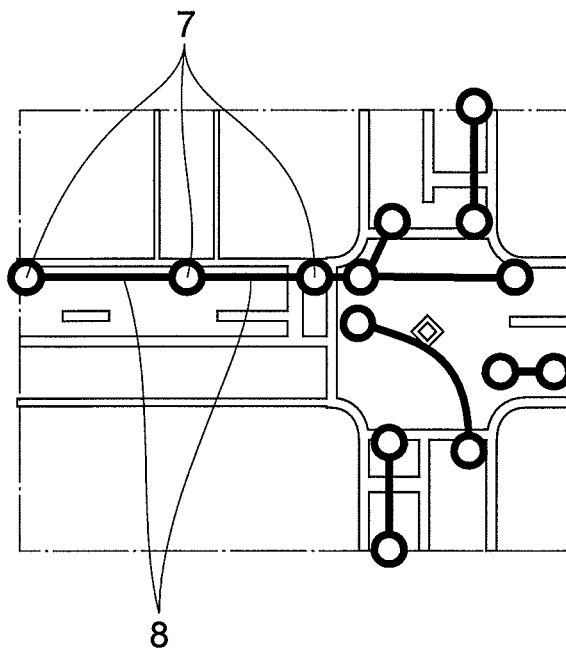
(b)
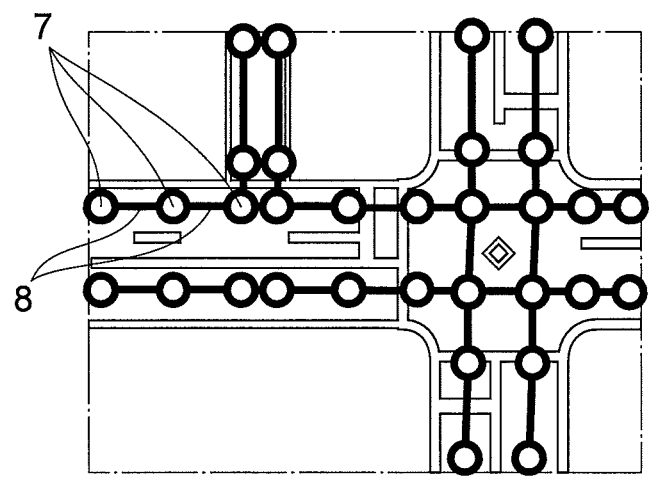

*Fig.8*

| TEMPORARY SELECTION RESULT OF TRAVELLING ROAD | DEVIATION DETERMINATION RESULT | | |
|---|---|---|---|
| | NONE | PRESENT (ONCE) | PRESENT (TWICE CONTINUOUSLY) |
| NONE | CONTINUOUS | CONTINUOUS | SHIFTING |
| TEMPORARY SELECTION OF SAME ROAD TWICE OR LESS CONTINUOUSLY | CONTINUOUS | CONTINUOUS | SHIFTING |
| TEMPORARY SELECTION OF SAME ROAD THREE TIMES OR MORE CONTINUOUSLY | ADDITIONAL DETERMINATION IS NECESSARY | ADDITIONAL DETERMINATION IS NECESSARY | ENTERING |

…

VEHICLE INFORMATION PROCESSING DEVICE

This is a 371 national phase application of PCT/JP2010/069360 filed 29 Oct. 2010, the contents of which are incorporated herein by reference.

TECHNICAL FIELD

The present invention relates to a vehicle information processing device which specifies a traveling road of a host vehicle.

BACKGROUND ART

As a vehicle information processing device in the related art, a technology has been known in which a position of a host vehicle is obtained by combining an assumed position of the host vehicle which is estimated using an in-vehicle sensor which detects the traveling distance and change in direction, and the absolute position of the host vehicle which is obtained using GPS, map data is referenced, and a road which is close to the position of the host vehicle is specified as a traveling road of the host vehicle (for example, refer to Patent Literature 1).

CITATION LIST

Patent Literature

[Patent Literature 1] Japanese Unexamined Patent Application Publication No. Hei 9-311045

However, in such a vehicle information processing device, detailed map data was essential, and it was not possible to specify with high reliability the traveling road of a vehicle not having detailed map data in an in-vehicle storage unit.

An object of the present invention is to provide a vehicle information processing device which is able to specify a traveling road of a host vehicle with high reliability without detailed map data in an in-vehicle storage unit.

Solution to Problem

An vehicle information processing device according to an aspect of the present invention is a vehicle information processing device which specifies a traveling road of a host vehicle which includes host vehicle information obtaining means for obtaining host vehicle information including current position information of the host vehicle using GPS; road information obtaining means for obtaining road information from an information transmission device which is installed in a road; surrounding roads extracting means for extracting surrounding roads on which the host vehicle may be traveling using the host vehicle information and the road information; traveling road temporarily selecting means for temporarily selecting a traveling road of the host vehicle using the host vehicle information, and the road information on the surrounding roads; reliability determining means for determining reliability of a temporary selection result of the traveling road temporarily selecting means; and traveling road specifying means for specifying a traveling road of the host vehicle using the reliability, and the temporary selection result of the traveling road temporarily selecting means.

In such as vehicle information processing device, host vehicle information including current position information of the host vehicle is obtained using the host vehicle information obtaining means, and the road information including the position information of a road is obtained from the information transmission device which is installed in a road using the road information obtaining means. The obtained host vehicle information and the road information are used by the surrounding roads extracting means, and the surrounding roads on which the host vehicle may be traveling are extracted from those pieces of information. The extracted road information on the surrounding roads is used by the traveling road temporarily selecting means, along with the host vehicle information, and the traveling road of the host vehicle is temporarily selected among the surrounding roads. In this manner, even when the host vehicle does not include the map data in the in-vehicle storage unit, it is possible to temporarily select a traveling road of the host vehicle. In addition, in the vehicle information processing device according to the present invention, the reliability of the result of the temporary selection of the traveling road temporarily selecting means is determined. The determined reliability is used by the traveling road specifying means along with the temporary selection result of the traveling road temporarily selecting means, thereby specifying the traveling road of the host vehicle according to the reliability. In this manner, it is possible to specify the traveling road of the host vehicle with high reliability, even when the host vehicle is a vehicle not having the map data in the in-vehicle storage unit.

Preferably, the vehicle information processing device according to the aspect of the present invention further includes deviation determining means for determining deviation in which whether or not the host vehicle is deviated from the traveling road is determined using a relationship between the road information of the traveling road which is specified by the traveling road specifying means and the host vehicle information which is obtained by the host vehicle information obtaining means after specifying the traveling road, in which the traveling road specifying means specifies a traveling road of the host vehicle further using the determination result of the deviation determining means. In this case, since the traveling road is specified using both information that the host vehicle has entered a new road and information that the host vehicle is deviated from the road on which the host vehicle has been driving up to now, it is possible to specify the traveling road of the host vehicle with higher reliability.

In addition, preferably, the traveling road specifying means specifies a traveling road of the host vehicle further using the number of temporary selection results of the traveling road temporarily selecting means which become the same continuously. In this case, it is possible to specify the traveling road of the host vehicle with higher reliability by changing a standard for specification of the traveling road according to the number.

In addition, as an effective configuration of the above-described operation, the traveling road temporarily selecting means uses at least one of a distance between the host vehicle and the surrounding roads, and an angle between a traveling direction of the host vehicle and a direction of the surrounding roads, as a relationship between the host vehicle information and the road information of the surrounding roads.

In addition, preferably, the reliability determining means determines the reliability using a plurality of pieces of reference information including a GPS precision, the number of surrounding roads, and a relationship between the host vehicle information and the road information of the surrounding roads. In this case, it is possible to determine appropriate reliability by using a plurality of pieces of reference information.

In addition, preferably, the reliability determining means classifies the respective plurality of pieces of reference information into a plurality of levels, has a reliability determination standard with which the reliability is set in each combination of levels of the plurality of pieces of reference information, and the reliability is determined based on the reliability determination standard. In this case, it is possible to determine a more suitable reliability by setting an arbitrary reliability in each combination of the plurality of pieces of reference information, and freely adjusting the reliability determination standard according to actual circumstances.

Advantageous Effects of Invention

According to a vehicle information processing device in the present invention, it is possible to specify a traveling road of a host vehicle with high reliability without detailed map data in an in-vehicle storage unit.

BRIEF DESCRIPTION OF DRAWINGS

FIG. 2 is an explanatory diagram of road information which is obtained from an information transmission device which is installed in a road.

FIG. 8 is an explanatory diagram of a fluctuation determination standard of a traveling road.

DESCRIPTION OF EMBODIMENTS

Figure 1:
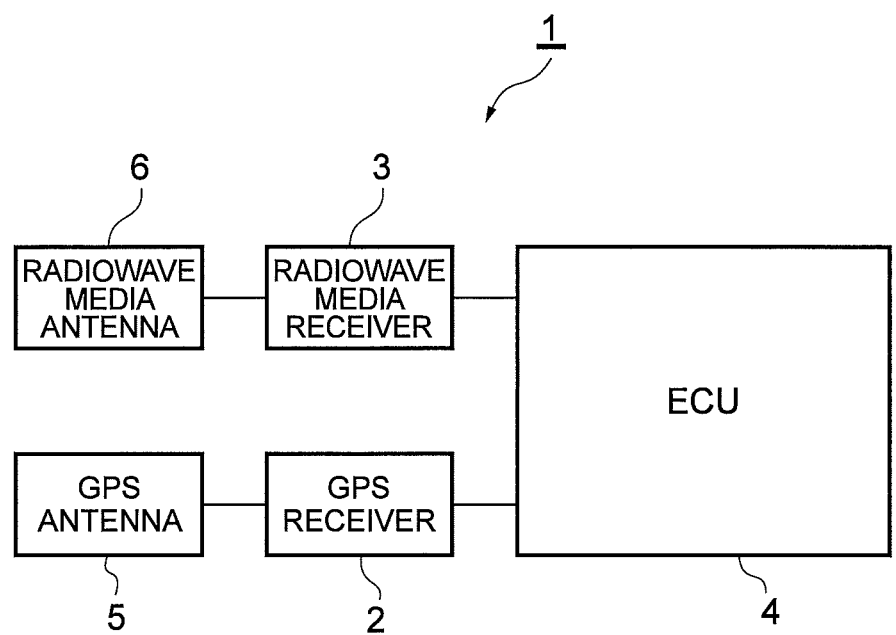
FIG. 1 is a schematic configuration diagram which illustrates an embodiment of a vehicle information processing device according to the present invention.

Hereinafter, preferable embodiments of the vehicle information processing device according to the present invention will be described in detail, with reference drawings. In addition, in the drawings, the same or similar elements are given the same reference numerals, and repeated descriptions will be omitted.

FIG. 1 is a schematic configuration diagram which illustrates a first embodiment of a vehicle information processing device according to the present invention. As illustrated in FIG. 1, a vehicle information processing device 1 includes a GPS receiver 2 as host vehicle information obtaining means, an radiowave media receiver 3 as road information obtaining means, an ECU (Electronic Control Unit) 4 which is connected to the GPS receiver 2, and the radiowave media receiver 3.

The GPS receiver 2 is a unit which receives information from a GPS satellite through a GPS antenna 5, and obtains host vehicle information using the GPS. The host vehicle information obtained by the GPS receiver 2 includes the position and the traveling direction of the host vehicle.

The radiowave media receiver 3 is a unit which obtains road information through an radiowave media antenna 6 from a radiowave media as an information transmission device which is installed in a road. Each radiowave media is provided at an intersection, or the like, and includes information on roads which are connected to the intersection or the like. As illustrated in FIG. 2(a), the road information included in the radiowave media is configured by a plurality of nodes 7 which denote position information of a plurality of locations on a road, and links 8 which connect the nodes 7 to each other. Hereinafter, a road of which the road information configured by the node 7 and the link 8 included in the radiowave media is referred to as "road included in data".

The node 7 is arranged at locations of a road in which a predetermined variation is present. The location of a road in which a predetermined variation is present is, for example, a location at which a road is curved, a location at which a side road joins, or the like. The road information which is included in the radiowave media includes the angle of a side road which joins the node 7. There are cases in which a side road which joins the node 7 is a road for which the road information configured by the node 7 and the link 8 is not included in the radiowave media. Hereinafter, such a road is referred to as a "road excluded from data". As described below, a possibility can be assumed in which the host vehicle is traveling the road excluded from data using angle information of the road excluded from data which joins the node 7.

In addition, the road information using the in-vehicle map data is also configured by the node 7 and the link 8 as illustrated in FIG. 2(b). In the road information which is obtained by the radiowave media receiver 3, the number of nodes 7 and links 8 are small, and are rough compared to the road information according to the map data.

Figure 3:
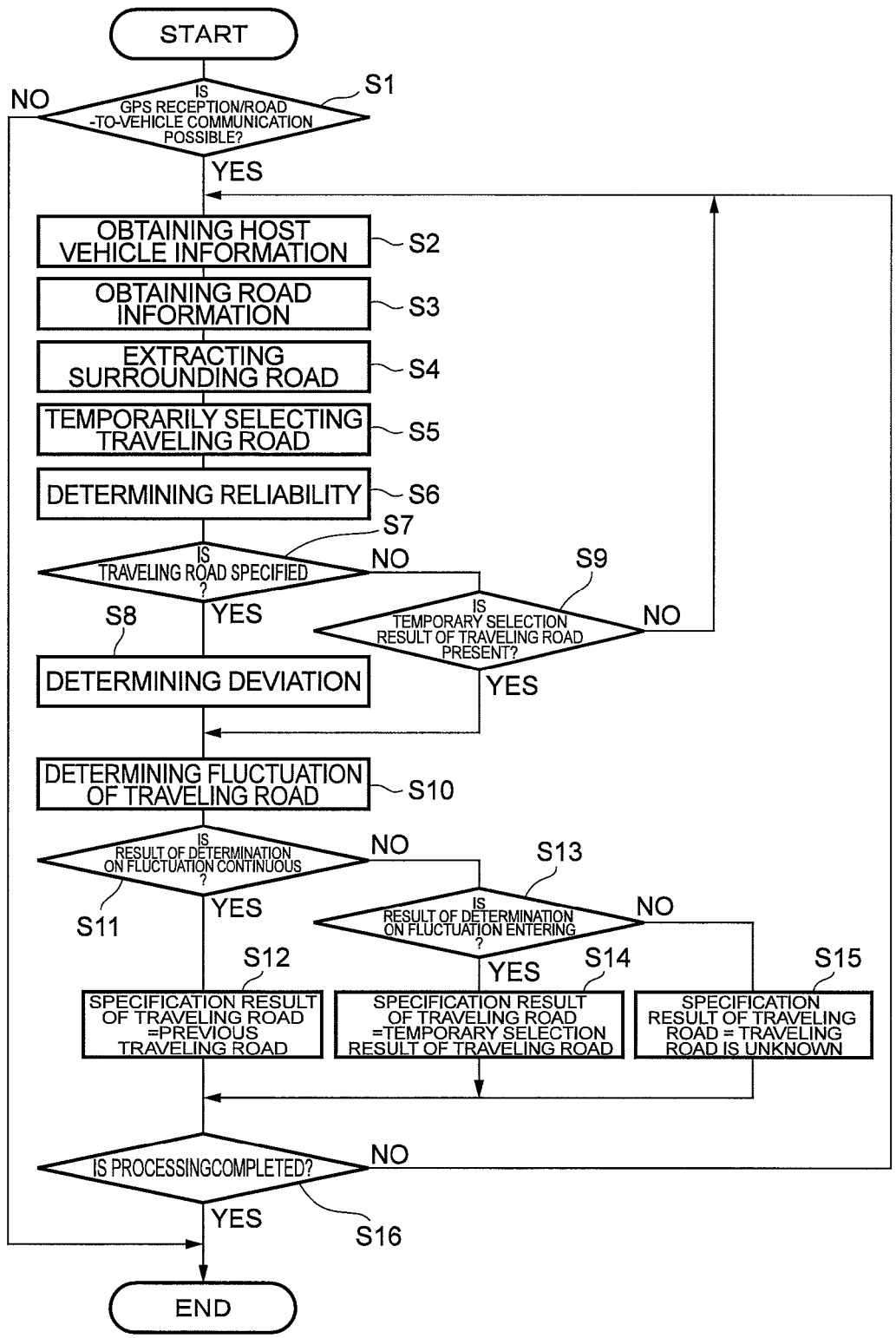
FIG. 3 is a flowchart which illustrates an order of specifying a traveling road which is executed using an ECU.

The ECU 4 performs a specific process with respect to the traveling road of the host vehicle according to the order which is illustrated in FIG. 3. First, whether or not the host vehicle includes the GPS receiver 2, and the radiowave media receiver 3, that is, whether or not it is possible to perform GPS reception and a road-to-vehicle communication is determined (step S1). When GPS reception and the road-to-vehicle communication are not possible, the process is ended. When the GPS reception and the road-to-vehicle communication are possible, host vehicle information is obtained through the GPS receiver 2 (step S2), and road information is obtained through the radiowave media receiver 3 (step S3).

When the host vehicle information and the road information are obtained, surrounding roads on which the host vehicle may travel are extracted using these pieces of information (step S4), and a traveling road is temporarily selected among the extracted surrounding roads (step S5). In this manner, the ECU 4 functions as the surrounding roads extracting means on which the host vehicle may be traveling, and the traveling road temporarily selecting means of the host vehicle.

Figure 4:
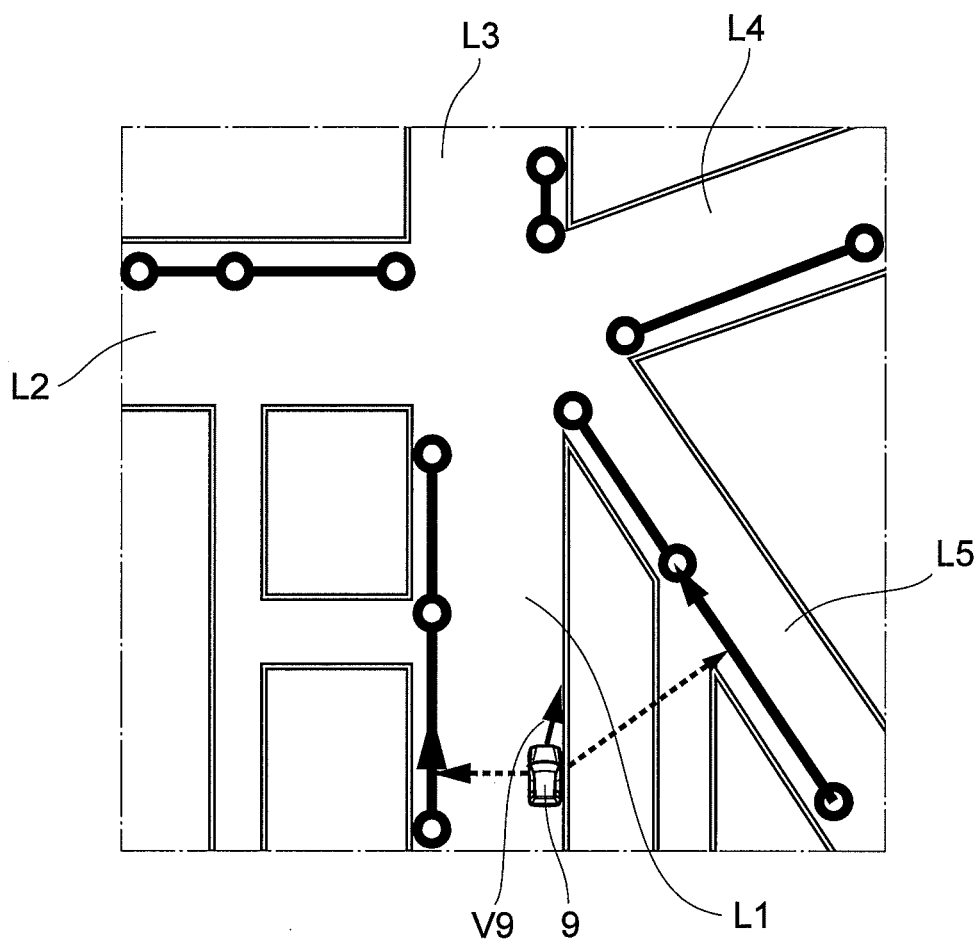
FIG. 4 is an explanatory diagram when extracting surrounding roads, and temporarily selecting a traveling road.

An example in which the surrounding roads are extracted, and a traveling road is temporarily selected will be described with reference to FIG. 4. FIG. 4 illustrates a state in which a host vehicle position 9 and a traveling direction V9 of the host vehicle are obtained, and road information of roads L1 to L5 is obtained. In this state, the roads L1 and L5 of which the distance to the host vehicle position 9 is short, and angles with respect to the traveling direction V9 is small are extracted as the surrounding roads. Further, regarding the respective roads, a value in which the distance to the host vehicle position 9 and the angle with respect to the traveling direction V9 are added in a predetermined weight distribution is calculated, and the road L1 of which the value is the smallest is temporarily selected as the traveling road of the host vehicle.

As illustrated in FIG. 3, when the traveling road is temporarily selected, reliability of the temporary selection result is determined (step S6). In this manner, the ECU 4 functions as the reliability determining means. In step S6, the reliability is determined using a plurality of pieces of reference information including the GPS precision, the number of surrounding roads, and the relationship between the host vehicle information and the road information of the surrounding roads. Specifically, the reliability is determined based on the reliability determination standard in which each piece of the reference information are classified into a plurality of levels, and the reliability is set in each combination of the respective levels of the pieces of reference information. In addition, when the determined reliability is low, a temporary selection result of the traveling road at this point of time is discarded, and it may be set such that the temporary selection result of the traveling road in the process at this time is not present.

Figure 5:
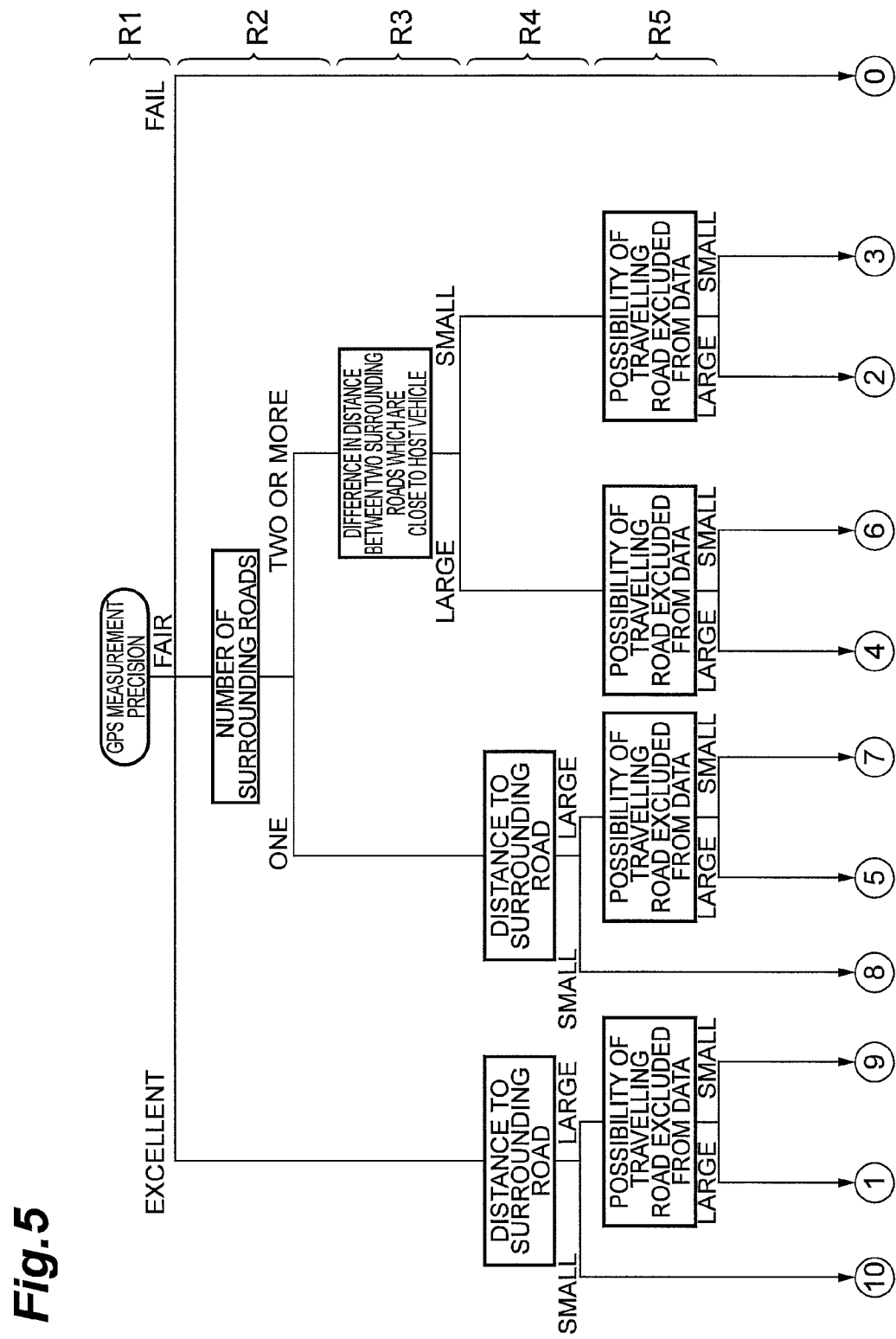
FIG. 5 is a tree diagram which illustrates a reliability determination standard.

An example of the reliability determination standard will be described with reference to FIG. 5. In FIG. 5, a plurality of pieces of reference information R1 to R5 are used. The reference information R1 denotes the GPS measurement precision, and is classified into three levels of "excellent", "fair", and "fail". The reference information R2 is the number of surrounding roads, and is classified into two levels of "1" and "2 or more". The reference information R3 denotes the difference between a distance to the closest surrounding road and a distance to the next closest surrounding road, and is classified into two levels of "large" and "small". The magnitude of the difference between the two distances may be the magnitude of the difference between the two distances, or may be the magnitude of the proportion of the two distances. The reference information R4 denotes the distance to the closest surrounding road, and is classified into two levels of "large" and "small". The reference information R5 denotes the possibility that the host vehicle is traveling on a road excluded from data, and is classified into two levels of "large" and "small".

A possibility of traveling the road excluded from data is, for example, determined by the relationship between angle information of the road excluded from data which joins the node 7 and the traveling direction of the host vehicle. Specifically, when the traveling direction of the host vehicle heads to the vicinity of a node 7, whether or not angle information on a side road which joins the node 7 is present is confirmed. When the angle information is present, whether or not the side road is the road excluded from data is confirmed. When the side road is the road excluded from data, the angle information of the side road is contrasted to the angle of the traveling direction of the host vehicle, and when the values are close to each other, the possibility of traveling the road excluded from data of the host vehicle is determined as "large". In addition, the possibility of traveling the road excluded from data may be determined based on the density of the nodes 7. In this case, for example, when the density of the node 7 is high, the possibility of traveling the road excluded from data is determined as "large", and when the density of the node 7 is low, the possibility of traveling the road excluded from data is determined as "small".

In addition, as the reliability in each combination of the respective levels of the pieces of reference information R1 to R5, values of 0 to 10 are set. An allocation of the reliability in each combination is arbitrarily set so that the reliability determination standard suits the circumstances. In particular, the reliability determination standard in FIG. 5 includes a rule that, if there is a high possibility that a road excluded from data is being travelled, the reliability when the level of the GPS measurement precision is low is determined as being higher than when the level of the GPS measurement precision is high.

Figure 6:
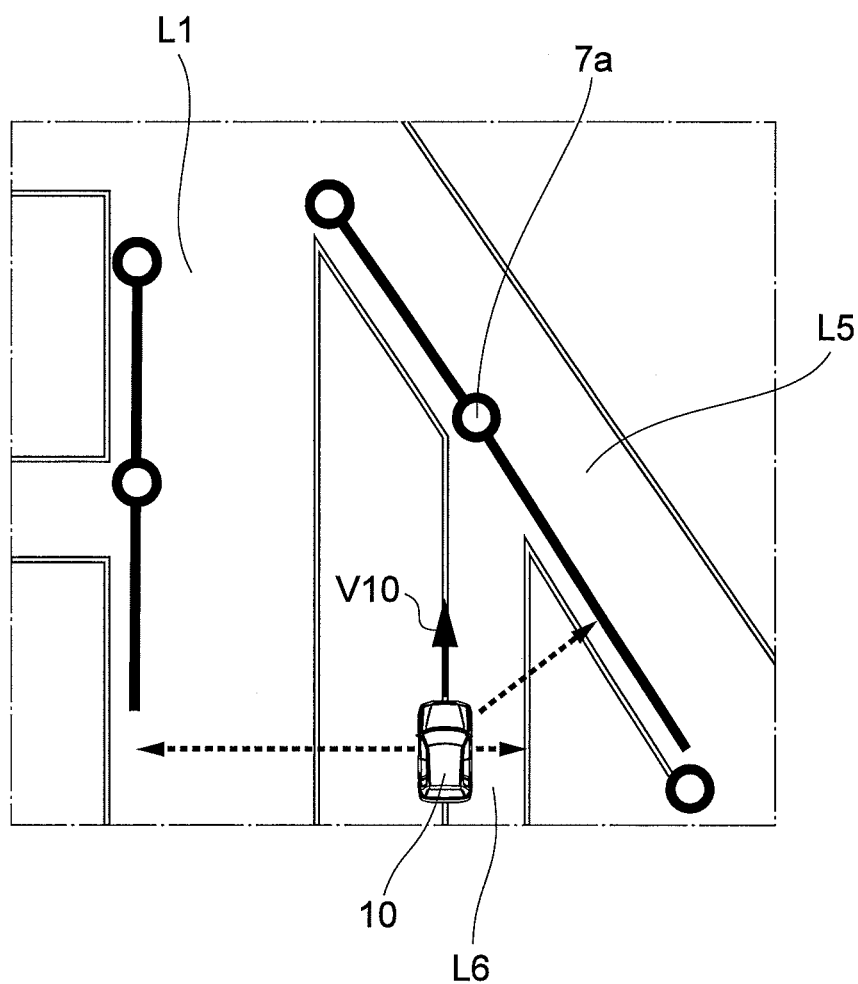
FIG. 6 is an explanatory diagram when determining reliability.

An example of determining the reliability based on the reliability determination standard in FIG. 5 will be described with reference to FIGS. 5 and 6. FIG. 6 illustrates a state in which the host vehicle position 10 is obtained as the host vehicle information, the roads L1 and L5 are extracted as the surrounding roads, and the road L1 is temporarily selected as the traveling road, and the reference information R1 is set to be "fair". In addition, in FIG. 6, a side road L6 as the road excluded from data is present. In this case, the extracted surrounding roads are two of the roads L1 and L5, the reference information R2 becomes "2 or more". Since a difference in distances between a host vehicle position 10 to the road L1 and the host vehicle position 10 to the road L5 is large, the reference information R3 becomes "large". The traveling direction V10 of the host vehicle heads towards the node 7a. The side road L6 as the road excluded from data joins the node 7a, and the values of the angle of the side road L6 and the angle of the traveling direction V10 are approximate values. Accordingly, the reference information R5 becomes "large". In addition, the value of the reliability in FIG. 6 becomes 4.

When the reliability is determined, as illustrated in FIG. 3, whether or not the traveling road is specified in the previous processing is determined (step S7). When the traveling road is specified, whether or not the host vehicle is deviated from the traveling road is determined using the relationship between the road information in the traveling road and host vehicle information which is obtained this time after the specifying (step S8).

Figure 7:
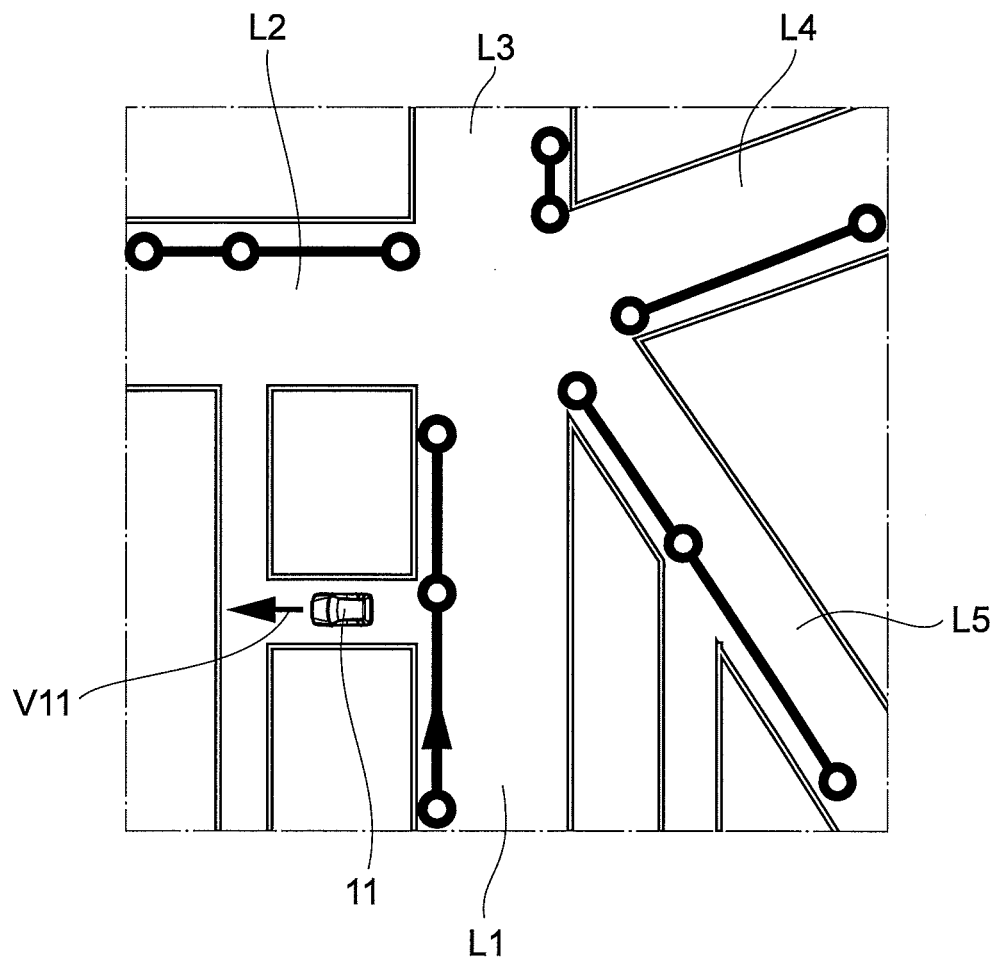
FIG. 7 is an explanatory diagram when determining deviation.

An example of determining deviation will be described with reference to FIG. 7. FIG. 7 illustrates a state in which the road L1 is specified as the traveling road, a host vehicle position 11 and the traveling direction V11 of the host vehicle are obtained as host vehicle information, and the pieces of road information of the roads L1 to L5 are obtained. In this state, since the angle between the traveling direction V11 of the host vehicle and the road L1 is large, it is determined that the host vehicle is deviated from the road L1 which is specified as the traveling road of the host vehicle.

As illustrated in FIG. 3, when the traveling road is not specified in the previous processing, whether or not a temporary selection result is present is determined (step S9), and when the temporary selection result is not present, processing returns to step S2. When the deviation is determined in step S8, or when it is determined that the temporary selection result of the traveling road is present in step S9, a determination of fluctuation in the traveling road is performed (step S10). The determination of fluctuation in the traveling road is performed using the temporary selection result of the traveling road at this time, the deviation determination result at this time, and the number of temporary selections of the road which is temporarily selected at this time up to this time continuously. Further, the determination of fluctuation according to the embodiment is performed further using the number of the deviation determination results up to this time which are continuously the same as the result of this time.

An example of the fluctuation determination standard of the traveling road will be described with reference to FIG. 8. FIG. 8 is a table in which the fluctuation determination standard of the traveling road is defined. A temporary selection result of the traveling road in the table denotes the number of temporary selections of roads that are different from the traveling road from which the deviation is determined (hereinafter, referred to as another roads). The column on the left in the table (excluding the row and column in the header) denotes the fluctuation determination standard in a case in which it is determined that there is no deviation from the traveling road, and another road is temporarily selected as the traveling road. In this case, it is determined that the traveling road is continuous without fluctuating, until another road is continuously selected second times without fluctuating. When another road is temporarily selected three or more times continuously, it is determined that an additional determination is needed.

When it is determined that an additional determination is needed, the additional determination is performed using the reliability which is determined in step S6. Specifically, reliability of a result in which another road is temporarily selected is compared to the reliability of a result in which a road which is specified as the current traveling road is temporarily selected in processing in the past. In addition, for example, when the reliability of the temporary selection result of another road is higher than the reliability of the temporary selection result of the road which is specified as the current traveling road, it is determined that the host vehicle has newly entered another road. On the other hand, when the reliability of the temporary selection result of another road is lower than the reliability of the temporary selection result of the road which is specified as the current traveling road, it is determined that the traveling road is continuous without fluctuating. In addition, the reliability of the temporary selection result of another road which is used here may be a mean value or a maximum value of the reliabilities which are determined when the road is temporarily selected continuously. In addition, the reliability of the temporary selection result of the road which is specified as the current traveling road may be a mean value or a maximum value of the reliabilities which are determined when the road is temporarily selected.

The column at the center of the table denotes the fluctuation determination standard when a first deviation determination is performed with respect to the previous traveling road, and another road is temporarily selected as the traveling road. In this case, the fluctuation determination standard is the same as that on the left column. The right column in the table denotes the fluctuation determination standard when a second deviation determination is performed with respect to the previous traveling road, and another road is temporarily selected as the traveling road. In this case, the traveling road is determined as under shifting until another road is temporarily selected twice continuously. When another road is temporarily selected three or more times continuously, it is determined that the host vehicle has newly entered the road.

When the traveling road is subject to the fluctuation determination, the traveling road is specified based on a result of the fluctuation determination. As illustrated in FIG. 3, first, whether or not the result of the fluctuation determination is continuous is confirmed (step S11), and when it is continuous, the previous traveling road is specified as the traveling road of this time (step S12). When the result of the fluctuation determination is not continuous, whether or not the result of the fluctuation determination is entry is confirmed (step S13), and when the result is entry, the road which is temporarily selected at this time is specified as a new traveling road (step S14). If the result of the fluctuation determination is not entry, the traveling road is set to be unknown (step S15). In this manner, the ECU 4 functions as traveling road specifying means which specifies the traveling road of the host vehicle using the reliability and the result of temporary selection of the traveling road. When the traveling road is specified, whether or not it is a situation in which processing is ended is determined (step S16). When it is a situation of ending the process, determination processing of the traveling road is ended. When it is not a situation of ending the process, the process returns to step S2. In addition, the situation of ending the process is, for example, a situation in which an operation of ending driving (ignition off, or the like) is performed, or the like.

In the vehicle information processing device 1 which is configured as above, since the traveling road of the host vehicle is temporarily selected using the host vehicle information which is obtained using the GPS receiver 2 as the host vehicle information obtaining means, and road information which is obtained by the radiowave media receiver 3 as the road information obtaining means, it is possible to temporarily select the traveling road of the host vehicle, even in a vehicle not having map data in the in-vehicle storage unit. In addition, in the vehicle information processing device 1, the reliability of the result of the temporary selection of the traveling road is determined by the ECU 4 as the reliability determining means, and the traveling road of the host vehicle is specified according to the level of the reliability. For this reason, even when road information using the radiowave media receiver 3 which is rough compared to the road information using the in-vehicle map data is used, it is possible to specify the traveling road of the host vehicle with high reliability.

In addition, the vehicle information processing device 1 determines whether or not the host vehicle is deviated from the traveling road using the relationship between the road information of the traveling road which is specified in the previous processing and the host vehicle information which is obtained at this time after the specifying, and specifies the traveling road of the host vehicle further using the determination result. For this reason, it is possible to specify the traveling road of the host vehicle with higher reliability, since the traveling road is specified using both information that the host vehicle has entered a new road, and information that the host vehicle has deviated from the road on which the host vehicle has been traveling up to now.

In addition, since the ECU 4 as the traveling road specifying means changes the standard for specification of the traveling road according to the number of times in which the temporary selection result of the traveling road becomes the same continuously, it is possible to specify the traveling road of the host vehicle with higher reliability. Further, since the ECU 4 changes the standard for specification of the traveling road according to the number of times in which the deviation determination results up to this time which are continuously the same as the result of this time, it is possible to specify the traveling road of the host vehicle with higher reliability.

In addition, since the ECU4 as the reliability determining means determines the reliability using a plurality of pieces of reference information including the GPS precision, the number of surrounding roads, and the relationship between the host vehicle information and the road information of the surrounding roads, it is possible to determine a suitable reliability In addition, the ECU 4 as the reliability determining means classifies the respective plurality of pieces of reference information into a plurality of levels, has the reliability determination standard with which the reliability is set in each combination of levels of the plurality of pieces of reference information, and determines the reliability based on the reliability determination standard. Thus it is possible to determine more suitable reliability, since an arbitrary reliability is set in each combination of the plurality of pieces of reference information, and the reliability determination standard is adjusted according to the circumstances.

In addition, the reliability determination standard which is included in the ECU 4 includes a rule that, if there is a high possibility that a road excluded from data is being travelled, the reliability when the level of the GPS precision is low is determined as being higher than when the level of the GPS precision is high, that is, the host vehicle is traveling a road of which information is not included in the radiowave media. For this reason, it is possible for the ECU 4 to determine more suitable reliability corresponding to circumstances without being limited only to the GPS precision. For example, when the host vehicle is separated from a road which is temporarily selected as the traveling road regardless of the high GPS precision, there is a high possibility that the host vehicle is not present on the road compared to a case in which the GPS precision is low. The reliability determination standard of the ECU 4 corresponds to such circumstances.

Figure 9:
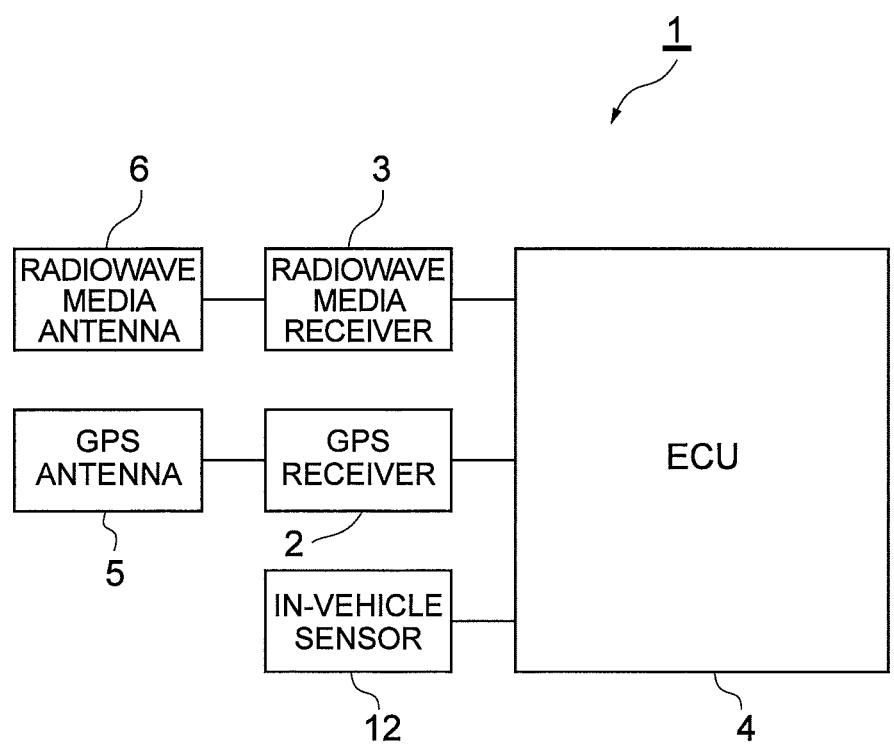
FIG. 9 is a schematic configuration diagram which illustrates a modification example of the vehicle information processing device according to the present invention.

In addition, the present invention is not limited to the above-described embodiment. For example, as illustrated in FIG. 9, the vehicle information processing device 1 may be configured such that an in-vehicle sensor 12 which independently detects the traveling distance, or a change in orientation of the host vehicle is included, a position, or the traveling direction of the host vehicle is assumed from information of the in-vehicle sensor 12 and used for supplementing the host vehicle information obtained by the GPS receiver 2.

Figure 10:
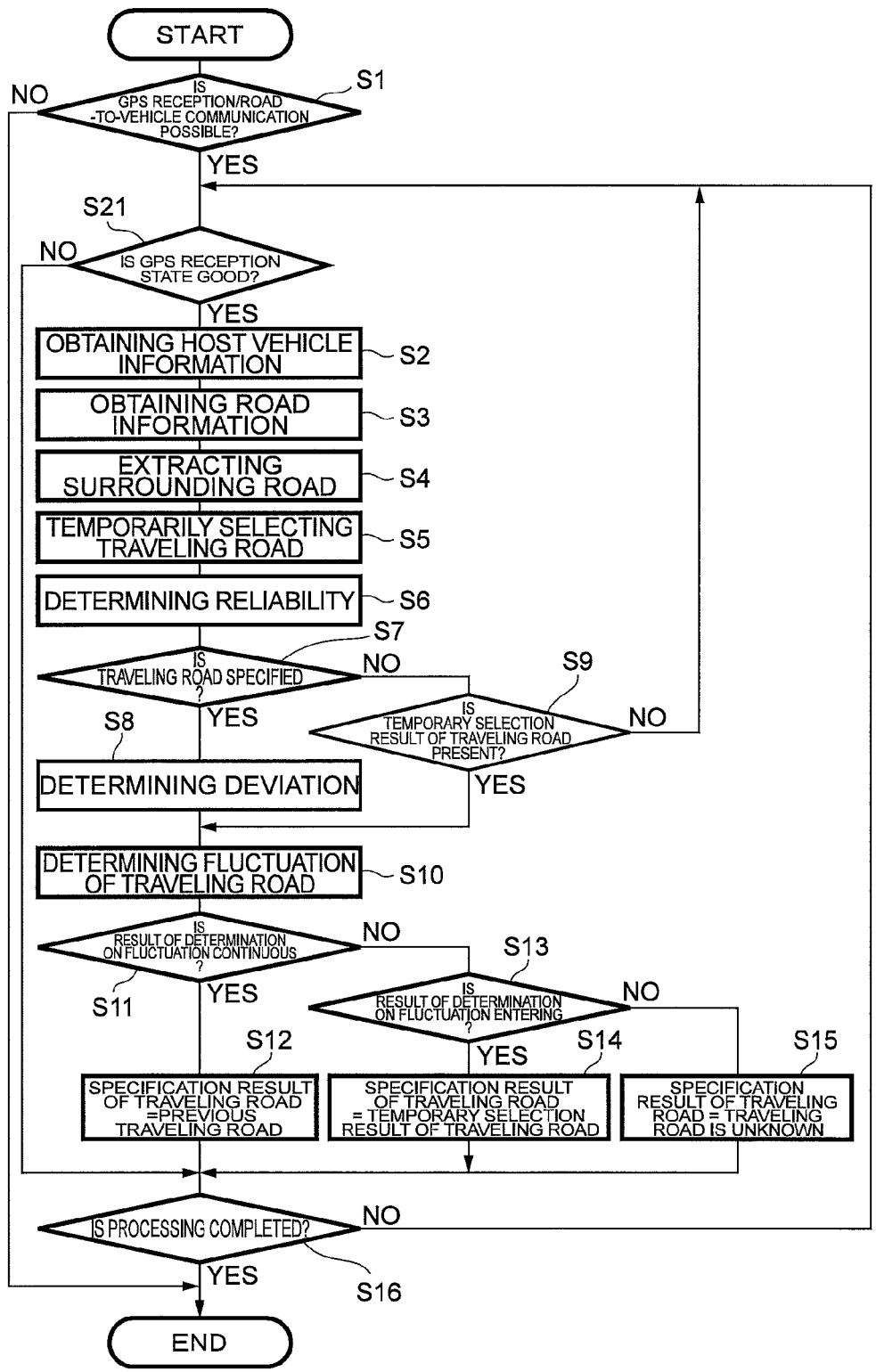
FIG. 10 is a flowchart which illustrates a modification example of a specified order of a traveling road which is executed by the ECU.

In addition, as illustrated in FIG. 10, it is also preferable that the reception state of the GPS receiver 2 be confirmed in the previous stage of step S2 in FIG. 3 (step S21), and the process proceed to step S16 without performing a specified process of the traveling road when the reception state is bad. In this manner, it is possible to omit useless processing, and to relieve a burden of the ECU 4.

INDUSTRIAL APPLICABILITY

According to the present invention, it is possible to provide a vehicle information processing device which is able to specify with high reliability a traveling road of a host vehicle not including detailed map data in an in-vehicle storage unit.

REFERENCE SIGNS LIST

1: VEHICLE INFORMATION PROCESSING DEVICE
2: GPS RECEIVER
3: RADIOWAVE MEDIA RECEIVER
4: ECU

The invention claimed is:

1. A vehicle information processing device which specifies a traveling road of a host vehicle, comprising:
 a GPS receiver configured to obtain host vehicle information including current position information of the host vehicle using a GPS;
 a radiowave media receiver configured to obtain road information from an information transmission device which is installed in a road;
 an electronic control unit which is connected to the GPS receiver and the radiowave media receiver the electronic control unit further comprising:
  a surrounding roads extracting unit configured to extract surrounding roads on which the host vehicle may be traveling using the host vehicle information and the road information;
  a traveling road selecting unit configured to temporarily select a traveling road of the host vehicle using the host vehicle information, and the road information on the surrounding roads;
  a reliability determining unit configured to determine reliability of a temporary selection result of the traveling road selecting unit using a plurality of pieces of reference information including a GPS precision, the number of surrounding roads, and a relationship between the host vehicle information and the road information of the surrounding roads; and
  a traveling road specifying unit configured to specify a traveling road of the host vehicle using the reliability, and the temporary selection result of the traveling road selecting unit.

2. The vehicle information processing device according to claim 1,
 wherein the plurality of pieces of reference information includes the difference between a distance to the closest surrounding road and a distance to the next closest surrounding road as the relationship between the host vehicle information and the road information of the surrounding roads.

3. The vehicle information processing device according to claim 1,
 wherein the plurality of pieces of reference information further includes a possibility in which the host vehicle is traveling a road excluded from data for which the road information is not included in the information transmission device.

4. The vehicle information processing device according to claim 3,
 wherein the reliability determining unit classifies the possibility in which the host vehicle is traveling the road excluded from data into high or low,
 after determining a low possibility that the road excluded from data is being traveled, the reliability is determined to be higher as the level of the GPS measurement precision becomes higher,
 after determining if there is a high possibility that the road excluded from data is being traveled, the reliability is determined to be lower as the level of the GPS measurement precision becomes lower.

5. The vehicle information processing device according to any one of claims 1 and 2 to 4, further comprising:
 a deviation determining unit configured to determine deviation wherein whether or not the host vehicle is deviated from the traveling road is determined using a relationship between the road information of the traveling road which is specified by the traveling road specifying unit, and the host vehicle information which is obtained by the host vehicle information obtaining unit after specifying the traveling road,
 wherein the traveling road specifying unit specifies a traveling road of the host vehicle further using the determination result of the deviation determining unit.

6. The vehicle information processing device according to any one of claims 1 and 2 to 4,
 wherein the traveling road specifying unit specifies a traveling road of the host vehicle further using the number of temporary selection results of the traveling road selecting unit which become the same continuously.

7. The vehicle information processing device according to any one of claims 1 and 2 to 4,
 wherein the traveling road selecting unit uses at least one of a distance between the host vehicle and the surrounding roads, and an angle between a traveling direction of the host vehicle and a direction of the surrounding roads, as a relationship between the host vehicle information and the road information of the surrounding roads.

8. The vehicle information processing device according to any one of claims 1 and 2 to 4,
   wherein the reliability determining unit is programmed to classify the respective plurality of pieces of reference information into a plurality of levels, and to have a reliability determination standard with which the reliability is set in each combination of levels of the plurality of pieces of reference information, wherein the reliability is determined based on the reliability determination standard.

* * * * *

UNITED STATES PATENT AND TRADEMARK OFFICE
CERTIFICATE OF CORRECTION

PATENT NO. : 9,097,539 B2
APPLICATION NO. : 13/881476
DATED : August 4, 2015
INVENTOR(S) : Toru Miyamoto Page 1 of 1

It is certified that error appears in the above-identified patent and that said Letters Patent is hereby corrected as shown below:

In The Claims

In column 9, line 58, change "receiver the electronic" to -- receiver, the electronic --.

Signed and Sealed this
Ninth Day of August, 2016

Michelle K. Lee
*Director of the United States Patent and Trademark Office*